United States Patent [19]

Sublette

[11] Patent Number: 5,480,550
[45] Date of Patent: Jan. 2, 1996

[54] BIOTREATMENT PROCESS FOR CAUSTICS CONTAINING INORGANIC SULFIDES

[75] Inventor: Kerry L. Sublette, Tulsa, Okla.

[73] Assignee: ABB Environmental Services, Inc., Portland, Me.

[21] Appl. No.: 238,466

[22] Filed: May 5, 1994

[51] Int. Cl.$^6$ ........................................ C02F 3/34
[52] U.S. Cl. .................... 210/611; 210/615; 210/631; 435/282
[58] Field of Search .................................. 210/601, 610, 210/611, 624, 631, 615–617; 435/282, 822, 911

[56] References Cited

U.S. PATENT DOCUMENTS

| | | | |
|---|---|---|---|
| 4,293,333 | 10/1981 | Drobot | 210/601 |
| 4,690,894 | 1/1987 | Brierley et al. | 210/601 |
| 4,737,289 | 4/1988 | Castaldi et al. | 210/611 |
| 4,898,827 | 2/1990 | Brierley et al. | 210/601 |
| 5,354,545 | 10/1994 | Buisman | 210/601 |

*Primary Examiner*—Thomas Wise
*Attorney, Agent, or Firm*—Chilton, Alix & Van Kirk

[57] ABSTRACT

A biological process is described for caustic waste streams containing inorganic sulfides to effect neutralization of the caustic and, oxidation of sulfides to sulfate. The process is based on the contact of these caustic streams with mixed, flocculated cultures of a sulfide-oxidizing bacterium from the genus *Thiobacillus* and various heterotrophs. The process may also degrade any organic components present in the waste stream.

10 Claims, 1 Drawing Sheet

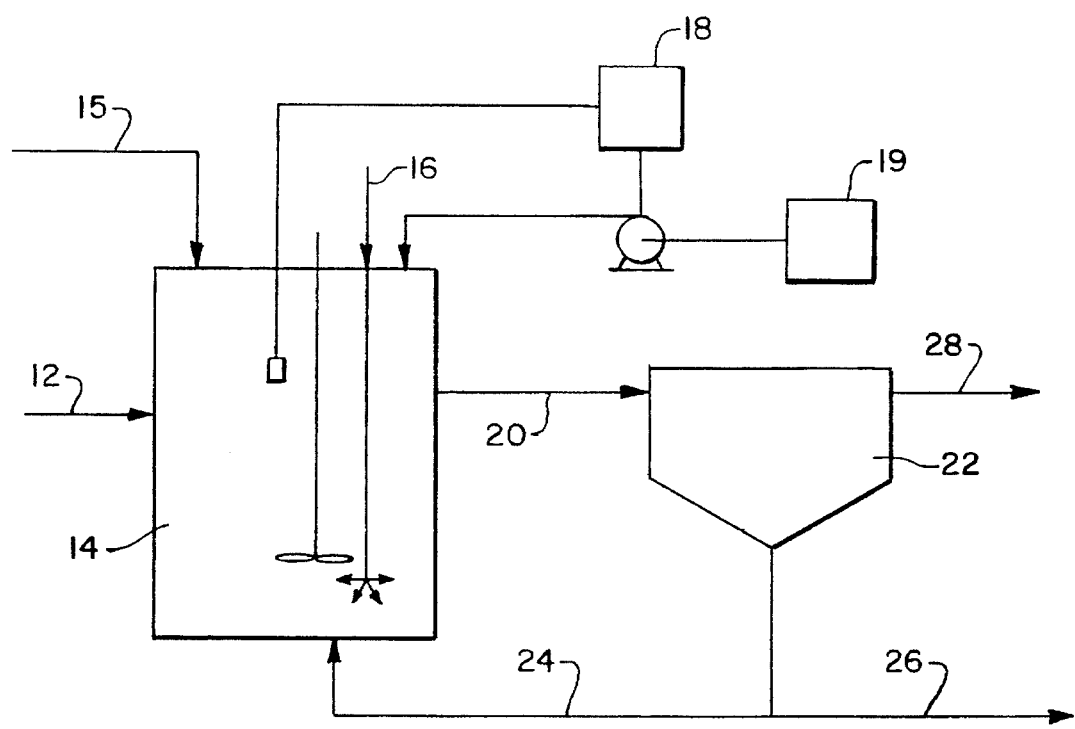

BIOTREATMENT PROCESS FOR CAUSTICS CONTAINING INORGANIC SULFIDES

BACKGROUND OF THE INVENTION

Sodium hydroxide (NaOH) solutions are used in petroleum refining to remove hydrogen sulfide ($H_2S$) from various hydrocarbon streams. Once $H_2S$ reacts with the majority of NaOH in the solution, the solution becomes known as spent-sulfidic caustic. Spent caustics typically have a pH greater than 12, sulfide concentrations exceeding 2–3 wt %, and a large amount of residual alkalinity. Depending on the source, spent caustic may also contain phenols, mercaptans, amines, and other organic compounds which are soluble or emulsified in the caustic. For example, a 20 wt % sodium hydroxide solution can be used to remove residual amounts of $H_2S$ from natural gas after the majority of $H_2S$ has been removed by the refinery gas plant amine unit. In this application, percent levels of amines can be found in the spent caustics due to amine carryover.

Currently, most spent-sulfidic caustics generated by refineries are either sent off-site to commercial operations for recovery or reuse (pulp and paper mills, for example) or for disposal by deep-well injection. Biological treatment in the refinery wastewater treatment unit is an inexpensive disposal option. However, many refineries do not have the wastewater treatment capacity to treat the entire amount of spent caustic generated and concerns regarding odors and toxicity frequently prohibit this practice.

Future regulatory changes are expected to result in more stringent controls and increased cost for off-site management of spent caustic. In such an event, low cost on-site treatment options would be desired. Even without regulatory changes, current off-site transportation and disposal cost warrant further investigation of on-site management alternatives. Wet-air oxidation is a commercially available process for on-site management of spent caustic, but wet-air oxidation can result in significant capital investment and high operating cost. Wet-air oxidation can be particularly expensive for spent-caustic streams from small to medium size refineries due to an insufficient economy of scale.

It has been shown that the bacterium *Thiobacillus denitrificans* will oxidize sulfides to sulfate. *T. denitrificans* is a strict autotroph and facultative anaerobe first described in detail by Baalsrod and Baalsrod ("Studies on *Thiobacillus denitrificans*," Arch. Mikro., 20, 34–62 (1954)). Sulfide, elemental sulfur and thiosulfate may be used as energy sources with oxidation to sulfate. Under anoxic conditions, nitrate may be used as a terminal electron acceptor with reduction to elemental nitrogen.

It has demonstrated that *T. denitrificans* may be readily cultured under aerobic or anoxic conditions with $H_2S(g)$ as an energy source at pH 7.0° and 30° C. When $H_2S$ (1% $H_2S$, 5% $CO_2$, and balance $N_2$) was bubbled into cultures previously grown on thiosulfate, $H_2S$ was metabolized with no apparent lag. At loadings of 4–5 retools $H_2S$/h - g biomass (mmols $H_2S$ per hour per gram biomass), $H_2S$ concentrations in the outlet gas could be reduced to undetectable levels with 1–2 seconds of gas-liquid contact time. Under sulfide-limiting conditions, concentrations of total sulfide in the culture media were less than 1 μM. Complete oxidation of $H_2S$ to sulfate was observed (Sublette, K.L. and N.D. Sylvester, "Oxidation of Hydrogen Sulfide by *Thiobacillus denitrificans*. Desulfurization of Natural Gas," Biotech. Bioeng., 29(6), 249–257 (1987); Sublette, K.L. and N.D. Sylvester, "Oxidation of Hydrogen Sulfide by Continuous Cultures of *Thiobacillus denitrificans*," Biotech. Bioeng., 27, 753–758 (1987); Sublette, K.L. and N.D. Sylvester, "Oxidation of Hydrogen Sulfide by Mixed Cultures of *Thiobacillus denitrificans* and Heterotrophs," Biotech. Bioeng., 29(6), 759–761 (1987); and Sublette, K.L., "Aerobic Oxidation of Hydrogen Sulfide by *Thiobacillus denitrificans*," Biotech. Bioeng., 29, 690–695 (1987)).

The effect of $H_2S$ loading on reactor performance has also been investigated. In certain experiments, the $H_2S$ feed rate was increased in steps until $H_2S$ breakthrough was obtained. At this point, the $H_2S$ feed rate exceeded the rate at which the $H_2S$ could be oxidized by the biomass. This upset condition was characterized by the accumulation of elemental sulfur and inhibitory levels of sulfide in the reactor medium. This upset condition was reversible if the cultures (either aerobic or anoxic) were not exposed to the accumulated sulfide for more than 2–3 hours. The maximum loading of the biomass, the specific feed rate at which $H_2S$ breakthrough occurs, was estimated to be 5.4–7.6 mmols $H_2S$/h-g biomass under anoxic conditions and 15.1–20.9 mmols $H_2S$/h-g biomass under aerobic conditions.

It has also been shown that heterotrophic contamination resulting from septic operation of *T. denitrificans* cultures has a negligible effect on $H_2S$ oxidation by the organism. The autotrophic medium used to grow *T. denitrificans* contained no organic components to support heterotroph growth. Apparently, organic carbon was obtained from waste products of *T. denitrificans* or cell lysis. It has also been demonstrated that *T. denitrificans* may be flocculated by aerobic co-culture with floc-forming heterotrophs from an activated sludge system (Ongcharit, C., P. Dauben and K.L. Sublette, "Immobilization of an Autotrophic Bacterium by Coculture with FlocForming Heterotrophs," Biotech. Bioeng., 33, 1077–1080 (1989) and Ongcharit, C., K.L. Sublette and Y.T. Shah, "Oxidation of Hydrogen Sulfide by Flocculated Thiobacillus denitrificans in a Continuous Culture," Biotech. Bioeng., 37, 497–504 (1991)). An $H_2S$-active, gravity-settlable floc resulted which was used to scrub $H_2S$ from a gas in a continuous stirred-tank reactor with biomass recycle. *T. denitrificans* remained flocculated with successive subculturing with no further introduction of floc-forming heterotrophs.

Sour water containing up to 25 mM inorganic sulfide was successfully treated in an aerobic up-flow bubble column (3.5 L) containing 4.0 g/L of flocculated *T. denitrificans* (Lee, C. and K.L. Sublette, "Microbial Oxidation of Sulfide-Laden Water," Water Research, 27(5), 839–846 (1993)). The sulfide-laden water was supplemented with mineral nutrients only. The sulfide-active floc was shown to be stable for nine months of continuous operation with no external organic carbon required to support the growth of the heterotrophs. The floc exhibited excellent settling properties throughout S the experiment. Retention times in the reactor varied from 1.2–1.8 hrs; however, molar sulfide feed rate (mmols/hr sulfide) was more important in determining the capacity of the reactor for sulfide oxidation than either the hydraulic retention time or the influent sulfide concentration (mM). At a biomass concentration of about 4 g/L, the column could be operated at a molar sulfide feed rate of 12.7–15.4 mmols/h without upset.

Wild-type *T. denitrificans* is inhibited by sulfide concentrations of 0.1–0.2 mM. However, sulfide-tolerant strains of *T. denitrificans* have been isolated by enrichment from cultures of the wild-type *T. denitrificans*. This is done by repeated subculturing at increasing concentrations of sulfide using standard subculturing techniques known in the art. A strain tolerant of sulfide concentrations in excess of 2.5 mM can be obtained (Sublette, K.L. and M.E. Woolsey, "Sulfide and Glutaraldehyde Resistant Strains of *Thiobacillus denitrificans*," Biotech. Bioeng., 34, 565–569 (1989)).

Other strictly aerobic *Thiobacilli* have also been shown to oxidize $H_2S$ to sulfate in a manner similar to *T. denitrificans*. These species include *T. versutus, T. thioparus, T. thiooxidans* and *T. neopolitanus* (Codenhead, P. and K.L. Sublette, Biotech. Bioeng., 35, 1150–1154 (1990)). These strains of *Thiobacilli* can likely be immobilized by co-culture with the floc-forming heterotrophs under aerobic conditions to produce a similar sulfide-oxidizing, gravity-settleable floc.

SUMMARY OF THE INVENTION

The current invention consists of a process whereby a caustic aqueous solution containing inorganic sulfides is contacted with a mixed aerobic culture of a sulfide-oxidizing bacterium from the genus *Thiobacillus* and various heterotrophs to effect the neutralization of the caustic and oxidation of sulfides to sulfate. The caustic solution may also contain one or more undesirable organic components which are degraded to carbon dioxide and water and other simple compounds by the heterotrophs in the culture. The mixed culture may be flocculated to facilitate collection of the process biomass by gravity sedimentation. More specifically, the process culture consists of a flocculated mixed culture of a *Thiobacillus* species and mixed heterotrophs in a medium consisting of mineral salts, a source of reduced nitrogen, phosphate and inorganic carbon (carbon dioxide, carbonate ion or bicarbonate ion). To whatever extent these nutrients can be supplied by the caustic feed, they are not required in the process culture medium.

BRIEF DESCRIPTION OF THE DRAWINGS

The drawing is a schematic diagram of the process of the present invention.

DETAILED DESCRIPTION OF THE PREFERRED EMBODIMENTS

The preferred embodiment of the current invention is illustrated by the following series of bench and pilot-scale experiments. A sulfide tolerant strain of *T. denitrificans* was used in all of these experiments as an example of the sulfide-oxidizing *Thiobacilli* that may be employed in the current invention.

Stock cultures of a sulfide tolerant strain of *T. denitrificans* were grown anoxically in 10 ml culture tubes at 30° C. in the thiosulfate medium described by Table 1. In this medium, thiosulfate is the energy source, nitrate the terminal electron acceptor, bicarbonate the carbon source and ammonium ion the source of reduced nitrogen.

TABLE 1

| Thiosulfate Maintenance Medium for *Thiobacillus denitrificans* | |
| --- | --- |
| Component | per liter |
| $Na_2HPO_4$, Sodium Phosphate, Dibasic | 1.2 g |
| $KH_2PO_4$, Potassium Phosphate, Monobasic | 1.8 g |
| $MgSO_4 \cdot 7H_2O$, Magnesium Sulfate | 0.4 g |
| $NH_4Cl$ Ammonium Chloride | 0.5 g |
| $CaCl_2$, Calcium Chloride | 0.03 g |
| $MnSO_4$, Manganese Sulfate | 0.02 g |
| $FeCl_3 \cdot 6H_2O$, Ferric Chloride | 0.033 g |
| $NaHCO_3$, Sodium bicarbonate | 1.0 g |
| $KNO_3$, Potassium Nitrate | 7.0 g |
| $Na_2S_2O_3$, Sodium Thiosulfate | 10.0 g |

TABLE 1-continued

| Thiosulfate Maintenance Medium for *Thiobacillus denitrificans* | |
| --- | --- |
| Component | per liter |
| Trace metal solution | 15.0 mL |
| Mineral water | 50.0 mL |

In a continuous fermentation, significant advantages may be gained by immobilization of microbial cells. Immobilization allows cells to be retained in the fermenter or readily recovered and recycled. Therefore, the hydraulic retention time and the biomass retention time are decoupled. Fermenters employing immobilized cells can then be operated at higher cell densities, higher dilution rates and greater operational stability than their counterparts with plakonic or free-cell biomass.

A method by which a non-flocculating microorganism such as *T. denitrificans* may be immobilized is by co-culture with one or more flocforming microorganisms. More specifically, the flocculating and nonflocculating organisms are cultured under conditions in which a commensalism is established between the autotroph and floc-forming heterotrophs with the growth of the latter limited by the availability of organic carbon. An immobilization matrix which grows along with the 3.0 autotrophic cells then results. The floc size is then determined by mixing conditions in the fermenter. The floc can be collected by gravity sedimentation from the effluent of a continuous fermenter and recycled. Immobilization means any mechanism by which the non-flocculating microorganism and the floc-forming microorganism combine (adsorption, entrapment, etc.) to form a floc.

In the immobilization, *T.* denitrificans was grown aerobically on thiosulfate to a cell density of approximately $10^9$ cells/ml. The medium used to grow *T. denitrificans* was totally autotrophic. Thiosulfate was the energy source and $NH_4Cl$ the source of reduced nitrogen. The medium also contained a phosphate buffer and sources of $Mg^{+2}$, $Ca^{+2}$, $Fe^{+3}$, $Mn^{+2}$ and other trace minerals. The medium was sparged with air supplemented with carbon dioxide (5%) which served as the only source of carbon. At the appropriate cell density, cells were harvested by centrifugation at 5000×g or 10 min at 25° C. and resuspended in fresh thiosulfate medium in a fermenter.

The immobilizing bacterium may be any heterotrophic bacterium which is floc-forming. One primary source of floc-forming bacteria is activated sludges. As a specific example, an activated sludge from a petroleum refinery waste treatment system was used as the source of floc-forming heterotrophs.

A 3-liter sample of this sludge was washed four times with 20 mM phosphate buffer (pH 7) by mixing settled sludge with two volumes of buffer followed by gravity settling and decanting. Finally, washed sludge was collected by centrifugation at 5000×g for 10 min at 25° C. and added to the suspension of *T. denitrificans* in fresh thiosulfate medium. The resulting mixture of *T. denitrificans* and activated sludge was agitated at 150 rpm and sparged with air supplemented with 5% $CO_2$ at 500 ml/Min. The pH was maintained at 7.0 by controlled addition of 6 N NaOH (thiosulfate and $H_2S$ oxidation by *T. denitrificans* are acid producing) and the culture incubated at 30° C. The growth of *T. denitrificans* was monitored by following thiosulfate utilization. (Thiosulfate was determined by titration with 0.05 N $I_2$ with a starch indicator). The medium was thiosulfate-limiting with respect to the growth of *T. denitrificans*. When thiosulfate was depleted, the agitation and aeration were terminated and the biomass allowed to settle under gravity. The supernatent liquid was then removed and discarded. In this way, the culture was enriched for *T. denitrificans* cells which become physically associated with the floc. The volume was made up with thiosulfate medium containing about 120 mM thiosulfate. This fed-batch cycle was repeated 5–6 times. The rate of thiosulfate utilization generally increased with each successive cycle.

It was anticipated that the growth of the floc-forming heterotrophs in the population would at some point be limited because of a lack of organic carbon in the medium. However, it was discovered that no organic carbon addition was required during the entire 15–20 day incubation period. The floc exhibited excellent settling properties at each cycle. Presumably, the floc-forming heterotrophs derived sufficient organic carbon from waste products of the *T. denitrificans* biomass and products of cell lysis. The activated sludge as obtained from the refinery waste treatment system contained many morphological forms of bacteria. However, at the end of the fed-batch cycles, microscopic examination revealed only short, gram-negative rods. *T. denitrificans* and *Zoogloea ramigera* are both short, gram-negative rods. *Z. ramigera* is the most common floc-forming bacterium found in a wide variety of activated sludge systems. The result of this procedure was a gravity-settleable, sulfide-oxidizing floc.

Five samples of spent-sulfidic caustic were successfully biotreated in a 1.5-L stirred-tank reactor. Sample characteristics are given in Table 2. All samples were odorous and likely contained organic compounds that were not identified.

TABLE 2

Characteristics of Spent-sulfidic Caustic Samples

| Sample | Sulfide (M) | COD (mg/L) | MDEA (wt %) | OH (M) |
|---|---|---|---|---|
| C1 | 1.06 | 82100 | 2.37 | 2.60 |
| C2 | 1.05 | 113800 | 3.17 | 1.04 |
| C3 | 1.06 | 107000 | 3.81 | 1.03 |
| C4 | 0.60 | 73300 | 2.08 | 2.46 |
| C5 | 0.58 | 40200 | ND | 2.91 |

(MDEA = methyl diethanolamine)
(ND = not detected)

The equipment used for bench-scale biotreatment of the sulfidiccaustic samples consisted of a B. Braun Biostat M fermenter. The reactor was initially charged with 1.5 L of the thiosulfate medium described above, without thiosulfate or nitrate, containing 1700 mg/L of flocculated *T. denitrificans*. The agitation rate was 180 rpm and the pH and temperatures were maintained at 7.0 and 30° C., respectively. The acid used for pH control was 10 N $HNO_3$. This particular acid was used so that acid addition could be monitored by following the nitrate concentration in the culture medium. The culture received a gas feed of 0.3–0.4 L/min of air with 5% $CO_2$. (No nitrate is utilized by *T. denitrificans* under aerobic conditions.) The outlet gas was sparged into 300 mL of 0.3 wt % zinc acetate to trap fugitive $H_2S$ from the bioreactor. A tee connection was located between the bioreactor and zinc acetate trap for gas sampling.

Spent sulfidic-caustic samples were diluted ⅕ with deionized water but not neutralized (pH>12). Diluted caustic was withdrawn through a tube that extended to the bottom of the cylinder. Feed was pumped to the bioreactor and introduced below the liquid surface at a point about 2.5 cm from the bottom of the vessel and adjacent to one of the agitator impellers.

At start-up, 150 mL of the process culture was removed from the bioreactor with the biomass recovered by centrifugation at 5000 g and 25° C. and returned to the culture. The supernatant from this centrifugation was the initial sample for sulfate, ammonium ion, nitrate and chemical oxygen demand determination. A sample for mixed liquor suspended solids determination was taken directly from the bioreactor after the biomass from the initial sample had been returned. At this time, the feed pump was activated and a ⅕ dilution of spent-sulfidic caustic (sample C1) was delivered to the bioreactor at approximately 7.2 mL/hr. As noted above, the feed reservoir contained 150 mL of diluted caustic. Therefore, the feed reservoir was emptied in 21 hrs. The reactor received no feed for the next 3 hrs. (The effective hydraulic residence time was 10 days.) At the end of this time, and each day thereafter, the feeding procedure was repeated with 150 mL removed from the bioreactor, the biomass recovered and returned to the culture. At the end of the 7th day of operation (after a total of 1050 mL of diluted caustic had been fed to the reactor), the agitation and gas feed were turned off and the biomass allowed to settle under gravity. The biomass settled to 25% of the original volume in less than 10 minutes. The clarified liquor was then siphoned off and replaced with fresh medium (described above) to a final volume of 1.5 L. The agitation and aeration were then resumed. At this time 150 mL of the culture were removed, the biomass recovered and returned to the culture and the feeding schedule resumed as described above using a second sample of caustic C2. This replenishment of the culture medium was also repeated after 5 days of operation at which time the caustic feed was changed to the C3 sample of the duration of the experiment. The experiment was terminated after 21 full days of operation, on the C series feeds.

The C4 and C5 samples were biotreated at the bench scale at a later S time using a second flocculated culture of *T. denitrificans* developed for this purpose. The bioreactor was operated as described above for 6 days using C4 as feed and 10 days using C5 as feed.

It is important to note that the spent-sulfidic caustic was introduced into the bioreactor without neutralization. Sulfide oxidation by *T. denitrificans* is acid producing. Therefore, if the reactor is operated on a sulfide-limiting basis at least partial neutralization of the added caustic can be achieved by the oxidation reaction if the reaction is sufficiently fast. This was indeed the case in this experiment. During the entire course of the experiment, the pH was maintained at 7.0–7.1 with only a small amount of acid addition as shown in Table 3. All of the acid produced by sulfide oxidation by the organism was neutralized by the hydroxide ion in the samples. The amount of $HNO_3$ required to maintain pH in the 7.0–7.1 range was dependent on the extent to which the alkalinity in the sample exceeded the acid produced by sulfide oxidation. Greater addition of nitric acid was required when the C1 sample was used as feed because of the much greater alkalinity of the sample (Table 2).

TABLE 3

Stoichiometry of Sulfide Oxidation by *T. dentrificans* in a Bench-scale Fed-batch Reactor with a Feed of Spent-sulfidic Caustic

| Sample | $SO_4^{-2}/S^{-2}$ (mole/mole) | $HNO_3/S^{-2}$ (mole/mole) | $H^+$ prod/$S^{-2}$ (mole/mole) | g Mixed liquor suspended solids/mole $S^{-2}$ |
|---|---|---|---|---|
| C1 | 1.00 | 1.06 | 1.39 | 4.1 |

TABLE 3-continued

Stoichiometry of Sulfide Oxidation by *T. dentrificans* in a Bench-scale Fed-batch Reactor with a Feed of Spent-sulfidic Caustic

| Sample | $SO_4^{-2}/S^{-2}$ (mole/ mole) | $HNO_3/S^{-2}$ (mole/ mole) | $H^+$ prod/$S^{-2}$ (mole/mole) | g Mixed liquor suspended solids/mole $S^{-2}$ |
|---|---|---|---|---|
| C2 | 1.07 | 0.048 | 0.94 | 6.1 |
| C3a | 1.10 | 0.040 | 0.94 | 18.3 |
| C3b | 1.01 | 0.040 | 0.94 | 15.9 |
| C4 | 0.98 | 3.0 | 1.10 | 8.5 |
| C5 | 1.00 | 4.0 | 1.02 | 11.8 |

$HNO_3/S^{-2}$ is the moles $HNO_3$ per mole sulfide oxidized required to maintain the pH at 7.0–7.1.
$H^+$ prod/$S^{-2}$ is the moles of acid produced per mole of sulfide oxidized.

Sulfate accumulated in the culture medium as the sulfidic caustics were fed to the bioreactor. A sulfur balance showed complete conversion of sulfide to sulfate (Table 3). No elemental sulfur was detected in the culture medium and no $H_2S$ was detected in the outlet gas or collected in the zinc acetate trap.

Ammonium ion was consumed as a source of reduced nitrogen as *T. denitrificans* grew at the expense of oxidation of sulfides in the caustic as an energy source when the C1 and C2 samples were used as feeds. However, there was an increase in the ammonium ion concentration when the C3 caustic sample was used as feed. The chemical oxygen demand concentration in the reactor increased as sulfidic caustic was fed to the bioreactor when the C1 and C2 samples served as feed. However, when the C3 sample was used as feed, the chemical oxygen demand initially started to rise but then sharply declined. The biomass concentration increased as expected during growth on the C2 and C3 samples indicating that *T. denitrificans* used sulfides in the caustic as an energy source to support growth. Biomass yields (Table 3) were comparable during this time to yields observed with $H_2S$ (g) as an energy source. However, when the C3 sample was used as feed the biomass concentration rose more sharply and biomass yields per mole of sulfide oxidized were much higher (Table 3).

During growth on the C1 and C2 samples the MDEA concentration increased with each feeding indicating that MDEA was accumulating without degradation. However, when the C3 sample served as feed, MDEA was detected in the medium for two days at low levels and then not detected again for the duration of the experiment. This suggests that the culture became acclimated to the MDEA and had begun to degrade the amine.

The unusual ammonium ion, chemical oxygen demand and biomass concentration results obtained when the C3 sample was used as feed are now understandable in light of the MDEA results. The surge in ammonium ion concentration was due to the liberation of ammonia during degradation of MDEA. The low chemical oxygen demand resulted from the corresponding lack of MDEA accumulating in the culture medium. The higher rates of mixed liquor suspended solids accumulation compared to the rate of sulfide feed resulted from the rapid growth of heterotrophs on MDEA once they had become acclimated.

Results obtained from biotreatment of sample C4 and C5 were very similar to those obtained with samples C1 and C2. Because of the shorter duration of these experiments, the culture did not acclimate to MDEA, thus MDEA accumulated (up to 2000 mg/L) in the culture medium throughout while C4 served as feed. However, the presence of MDEA did not interfere with sulfide oxidation (Table 3). C5 did not contain MDEA.

As seen in Table 3, much more $HNO_3$ per mole of sulfide oxidized was utilized in biotreating samples C4 and C5 compared to C1, C2 and C3. This was due to the lower sulfide concentrations and higher hydroxide in concentrations in these samples (Table 2). Note, however, that the moles of acid produced per mole of sulfide oxidized is roughly the same for all samples (Table 3). Lastly, biomass yields with samples C4 and C5 were observed to be about twice those observed with samples C1 and C2 (prior to MDEA utilization). This has been attributed to stimulated growth of the heterotrophs at the expense of unidentified organics in C4 and C5 samples.

Pilot-scale biotreatment of spent sulfidic caustic was conducted in a 3.8-m³ stainless steel tank. The tank was horizontal and semi-cylindrical, 170 cm deep and 660 cm long on the inside. The tank was jacketed with cooling/heating coils running length-wise in the jacket annular space. A 2-hp (horse power) variable speed DC motor and gearbox were mounted on a platform which bridged the center of the vessel. The motor drove a paddletype stirrer which was 81 cm in diameter and 12 cm wide. The agitation rate was 50 rpm. On either side of the stirrer platform were stainless steel lids which completely closed the top of the vessel. The tank was modified by fitting with stainless-steel baffles, each 1/10 of the major or minor dimensions of the tank, and a sparger. The sparger was fabricated from 2.5-cm stainlesssteel tubing in a U-shape. It was fed with air at the bottom of the U through a 2.5-cm stainless-steel tube which extended through the wall of vessel at the center and bottom. The sparger was centered under the stirrer with the branches of the U equal in length to the stirrer diameter. The U branches had equally spaced 0.32-cm holes drilled on the bottom such that the total hole area on each branch was two times the cross-sectional area of the tube.

Air was fed to the reactor using both a ring compressor and line air from an in-house compressor. About 0.85 standard m³/min of air was supplied by the blower to the sparging system. Air from the blower was cooled with a heat-exchanger using house water at 15° C. Line air was introduced into the reactor at each end with two supplemental spargers which consisted of 1.25 cm stainless-steel tubes bent at one end to produce a 0.3 m section which was perforated with 0.32 cm holes. An additional 0.42–0.57 standard m³/min could be provided to the reactor in his manner Temperature control in the 3.8-m³ tank was achieved by circulating water from a refrigerated recirculator through the jacket coils. Some heating could also be obtained as needed by reducing the cooling water flow rate to the blower after-cooler, thereby increasing the temperature of the air. The temperature was maintained at 30°±1° C. The pH was monitored and controlled at 7.0±0.05 by a pH meter/controller which activated a pump to deliver acid or alkali as needed.

The flocculated *T. denitrificans* biomass required to operate the pilot-scale bioreactor was produced as follows. *T. denitrificans* was immobilized by aerobic co-culture with floc-forming heterotrophs at the bench scale as described above. When a sulfide-active, gravity settleable floc was obtained, this culture was used to inoculate 0.19 m³ of thiosulfate medium (without nitrate) in a jacketed stainless-steel stirred-tank reactor. The culture was maintained at 30° C. by circulating water at this temperature through the jacket from the refrigerated recirculator. The pH was monitored and maintained at 7.0±0.05 by delivery of 50% NaOH as needed. The culture o was aerated with line air from an in-house compressor at 0.085–0.14 standard m³/min. The reactor also received a gas feed of pure $CO_2$ from a compressed gas tank at a rate of about 5% of the aeration rate. The culture was agitated by means of a single 15 cm, six-bladed, disk-type impeller at 30–50 rpm. When the thiosulfate was depleted (2–3 days), the contents of this reactor were used to inoculate the 3.8 m³ reactor described above.

Each batch of flocculated *T. denitrificans* biomass was produced as follows. The 3.8 m³ tank was filled with tap water and agitated with the stirrer. Components of thiosulfate medium were then added and allowed to dissolve one at a time. The thiosulfate medium used in the 3.8 m³ reactor was identical to that described above except that the $NaHCO_3$ concentration at this scale was higher (3.0 g/L). The smaller volume cultures described above used $CO_2$ as a source of carbon. At the 3.8 m³ scale, this was prohibitively expensive; therefore, $NaHCO_3$ was used as the sole carbon source. The pH was initially adjusted to 7.0 with 50% NaOH as described above. When the temperature reached 30° C., the culture was inoculated.

The first inoculum used was produced in the 0.19 m³ stirred-tank reactor described above. Subsequent inocula consisted of a fraction of the biomass produced in the previous batch. Following inoculation, each batch was maintained under conditions described above until the thiosulfate was depleted. The medium was thiosulfate-limiting. When the thiosulfate was completely utilized, the contents of the reactor were pumped to a 0.23 m³ open-top, conical bottom tank (in two batches) to allow the flocculated biomass to settle under gravity for about 2 hours. A concentrated suspension of biomass was then drawn from the bottom of the tank. On an average, about 20L of concentrated suspension was obtained. About 20% was used to inoculate the next batch. The remainder was stored at 4° C. in a polypropylene barrel. Several batches of *T. denitrificans* biomass were prepared in this way for subsequent biotreatment pilot-scale of sulfidic caustic and other purposes.

The 3.8 m³ stirred-tank reactor was utilized for pilot-scale biotreatment of spent-sulfidic caustic as follows. About 40L of the concentrated suspension of flocculated *T. denitrificans* was used to inoculate 3.0 m³ of thiosulfate-free medium. The initial mixed liquor suspended solids was 630 mg/L. Spent sulfidic caustic (samples C4 and C5, about 180L of each) was fed (undiluted) at a rate of 30 mL/min to the reactor and introduced below the liquid surface near the impeller tip. The temperature was maintained at 30° C. and pH at 7.2±0.1 with 85% $H_3PO_4$, industrial grade. The agitation rate was 50 rpm and aeration rate was about 1.1 standard m²/min (blower +line air). The culture was operated with spent sulfidic caustic feed intermittently during the evenings and on weekends because of the odor from the caustic. When not receiving a caustic feed (10–12 hrs at a time), the culture was maintained at temperature with aeration. The total operating time with spent caustic feed was 200 hrs.

Sulfate accumulated in the reactor medium as caustic was fed to the reactor. No hydrogen sulfide emissions were detected from the reactor at any time during 200 hrs of operation and no sulfide was detected in the culture medium. The overall sulfate/sulfide ratio observed was 1.3. However, only the soluble sulfide concentrations in these samples were used to calculate this ratio. These samples contained copious amounts of iron sulfides. Iron sulfides in the feed were most notable when feed was initiated from a new barrel (after some agitation in getting the barrel in place) and after about 75% of the caustic in each barrel had been pumped out. In the latter case, the solids had concentrated at the bottom of the barrel. In fact, the sludges were so viscous at the bottom of the barrel that they could not be pumped out.

The elemental sulfur concentration in the reactor medium averaged about 0.3 mg/L except for one five hour period when we attempted to double the caustic feed rate. This increase in feed rate caused an upset condition in which the elemental sulfur concentration became high enough to give the culture a white color. The caustic feed was stopped and the culture aerated overnight. The next day the elemental sulfur was gone (oxidized to sulfate) and the caustic feed was resumed at 30 mL/min with no further difficulties.

The biomass concentration rose rather sharply following initiation of caustic feed; however, the rate of increase slowed after about 70 hrs. This may have been due to increased solids in the feed during this time since the barrel was agitated somewhat during setup. Once the iron sulfide settled down below the intake to the pump, the solids concentration in the feed fell. The overall biomass yield was 10.8 g/mole of soluble sulfide.

The ammonium ion concentration was seen to decrease as caustic was fed to the reactor as ammonium ion was used as a source of reduced nitrogen by the organisms (data not shown). The COD concentration was B seen to increase as caustic was fed to the reactor. This is likely due to the presence of an unidentified organic compound present in the caustic which was not degraded by the culture. Such a compound was detected (but not identified) by gas chromatography. About 2.8 moles of $H_3PO_4$ were required per mole of soluble sulfide in the caustic to maintain the pH at 7.2. A total of 360L of refinery spent sulfidic caustic was successfully treated in about 200 hours of run time.

The initial mixed liquor suspended solids concentration in the 3.8 m³ reactor was only 620 mg/L. A commercial system would operate with a mixed liquor suspended solids of about 4000–5000 mg/L (similar to an activated sludge system). Past experience with flocculated *T. denitrificans* indicates that 1 mmole sulfide/hr-g mixed liquor suspended solids is a conservative design figure for the specific activity of the biomass for sulfide oxidation. Based on this specific activity and assuming the mixed liquor suspended solids concentration in the bioreactor of 4000 mg/L, a 3.8 L/min (1 gpm) stream with 3 wt % sulfide will require a 53 m³ bioreactor. A secondary settler and capacity for biomass recycle will also be required for continuous operation. The sulfidic caustic biotreatment system will resemble a small activated sludge treatment system. In fact, the system can be thought of as a specialized activated sludge treatment system.

Estimated cost of a commercial system treating a 3.8 L/min (1 gpm) caustic stream containing 3 wt % sulfide is given in Table 4. The system was assumed to be on line 80% of the time. Nutrient costs were estimated assuming that treated effluent from the refinery supplemented with only $NH_4NO_3$ and $P_2O_5$ (common fertilizers) would serve as the nutrient feed to the bioreactor. All other mineral requirements of the organism could likely be supplied by the refinery effluent. In a field test of microbial sulfide oxidation for treatment of sour water, produced water supplemented with just these two nutrients resulted in successful operation for six months (K.L. o Sublette, D.E. Morse and K.T. Raterman, "A Field Demonstration of Sour Produced Water Remediation by Microbial Treatment," SPE 26396 (1993)). Estimated nutrient costs in Table 4 are based on nutrient costs per unit weight of sulfide determined in the field test.

Power requirements (for an agitator and blower) were estimated by scaling-up the power requirements of the 3.8 m³ bioreactor for treatment of the spent sulfidic caustic sample. A cost of 0.05/kW-hr was assumed. The capital costs of the system were estimated to be about $200,000. These costs were annualized assuming a 10-yr useful life and a 12% interest rate. Operating costs are assumed to be minimal. Properly instrument for pH control, the 3.8 m³ reactor was operated for 8 hrs at a time without an attendant without problems. The costs of acid for pH control is also not included in Table 4. The costs of acid will be dependent upon the relative amounts of sulfide and alkalinity in the caustic. The greater the sulfide concentration relative to the alkalinity, the less acid that will be required since sulfide oxidation is acid producing. The particular samples biotreated in the 3.8 m³ reactor had relatively low sulfide concentrations and high residual alkalinities.

TABLE 4

Estimated Operating Cost of a Commercial-scale Bioreactor System for Treatment of Spent Caustic[1]

|  | $/gal | $/yr[5] |
| --- | --- | --- |
| Nutrients[2] | $0.010 | $4,208 |
| Power[3] (agitator & blower) | $0.043 | $18,094 |
| Capital costs[4] | $0.068 | $35,400 |
| Total | $0.121 | $57,702 |

[1]gpm (3.8 L/min) with 3 wt % sulfide
[2]$NH_4NO_3$ and $P_2O_5$
[3]assumes $0.05/kW-hr
[4]assumes $200,000, 10-yr useful life and i = 12%
[5]assumes 80% on time Reference will now be made to the drawing which illustrates a preferred embodiment of the current invention. The caustic/sulfide mixture 12 to be treated is fed to a stirred-tank bioreactor 14 containing a mixed, flocculated culture of a sulfide-oxidizing bacterium from the genus *Thiobacillus* and various heterotrophs in a mineral salts medium. The caustic stream is fed to the bioreactor 14 at such a rate as to not exceed the specific activity of the Thiobacillus species for sulfide oxidation. Nutrients 15 (reduced nitrogen, phosphate, carbonates, etc.) may be metered to the bioreactor 14 as needed. The bioreactor 14 also receives aeration at 16 at a sufficient rate so that the biooxidation of sulfide (and organics, if any) does not become oxygen limited. A pH control system 18 monitors pH in the reactor and meters 85% $H_3PO_4$ from the acid reservoir 19 when and as needed to maintain the pH at 7.0±0.2. The effluent 20 from the bioreactor consists of a suspension flocculated *Thiobacillus* and heterotrophs in mineral salts medium plus sulfate, the oxidation product of sulfide. The effluent 20 flows to a gravity settler 22 where the biomass settles under gravity. Some fraction 24 of the concentrated biomass from the settler is recycled to the bioreactor 14 at such a rate as to maintain desired biomass concentration in the bioreactor 14. The remaining fraction 26 of concentrated biomass from the settler is disposed of and represents the net production biomass from growth on components of the caustic 12. The clarified effluent 28 from the settler consists of an aqueous solution of mineral salts including sulfate, the product of sulfide oxidation.

I claim:

1. A method of treating an aqueous caustic solution containing inorganic sulfides comprising the steps of:
   a. iramobilizing an autotrophic bacteria by co-culture with at least one floc-forming heterotroph under aerobic conditions to form a flocculated biomass;
   b. suspending said biomass in a mineral salt medium sufficient to support growth of said autotrophic bacteria; and
   c. introducing said aqueous caustic solution containing said inorganic sulfide into said suspension whereby said inorganic sulfide is oxidized to sulfate and an acid is produced and wherein said acid at least partially neutralizes said caustic.

2. A method as recited in claim 1 wherein said autotrophic bacterium is *T. denitrificans*.

3. A method as recited in claim 2 wherein said *T. denitrificans* is a sulfide tolerant strain.

4. A method as recited in claim 1 wherein said autotrophic bacteria are of the genus *Thiobacillus*.

5. A method as recited in claim 4 wherein said autotrophic bacteria is selected from the group consisting of *T. versutus, T. thioparus, T. thiooxidans,* and *T. neopolitanus*.

6. A method as recited in claim 1 wherein said floc-forming heterotroph comprises an activated sludge containing said heterotroph.

7. A method as recited in claim 6 wherein said activated sludge contains the floc-forming heterotroph *Zoogloea ramigera*.

8. A method of treating an aqueous caustic solution containing inorganic sulfides comprising the steps of:
   a. immobilizing a sulfide tolerant strain of *T. denitrificans* by co-culture with at least one floc-forming heterotroph under aerobic conditions to form a flocculated biomass;
   b. suspending said biomass in a mineral salt maintenance medium containing a quantity of nutrients sufficient to support growth of said *T. denitrificans;*
   c. introducing an aqueous caustic solution containing inorganic sulfide into said suspended biomass whereby said inorganic sulfide is converted to sulfate and said caustic is at least partially neutralized.

9. A method as recited in claim 8 wherein said floc-forming heterotroph comprises an activated sludge containing said heterotroph.

10. A method as recited in claim 9 wherein said activated sludge contains the floc-forming heterotroph Zoogloea ramigera.

* * * * *